United States Patent [19]

Graham et al.

[11] 4,144,174
[45] Mar. 13, 1979

[54] TRAVELING SIPHON SLUDGE COLLECTOR

[75] Inventors: Richard B. Graham; Richard N. Mercurio, both of Columbus, Ohio

[73] Assignee: Dresser Industries, Inc., Dallas, Tex.

[21] Appl. No.: 815,482

[22] Filed: Jul. 14, 1977

[51] Int. Cl.² ............................................. C02C 1/36
[52] U.S. Cl. ................................................. 210/527
[58] Field of Search ................ 210/527, 530, 523, 407

[56] References Cited

U.S. PATENT DOCUMENTS

| | | | |
|---|---|---|---|
| 698,265 | 4/1902 | Didelon | 137/141 |
| 2,219,007 | 10/1940 | Dostal | 210/523 |
| 2,866,557 | 12/1958 | Easterday | 210/527 |
| 3,235,083 | 2/1966 | Sontheimer et al. | 210/83 |
| 3,333,704 | 8/1967 | McGivern et al. | 210/527 |
| 3,797,664 | 3/1974 | Pentz et al. | 210/527 |
| 3,993,568 | 11/1976 | Fux | 210/527 |

Primary Examiner—William A. Cuchlinski, Jr.
Assistant Examiner—Jon E. Hokanson

Attorney, Agent, or Firm—John M. Lorenzen; John N. Hazelwood

[57] ABSTRACT

The invention is an improved apparatus for collecting sludge off the bottom of settling tanks such as used in water treatment systems. The collector includes a carriage or bridge which travels on tracks along the tank wall. A siphon tube is suspended in the tank from the carriage and includes two or more sludge intakes spaced across one dimension of the tank proximate to the sludge layer. The tubes are connected to a common header, which in one embodiment also serves as a structural member of the bridge. The header is closed at one end and connected at the other end to an arched section of the tube which extends up and over the tank wall to a sludge discharge channel. A discharge section is supported in the sludge channel in association with the free end of the arched section, and can be adjusted to regulate the flow through the siphon pipe. Except for the arched section, all of the siphon tube and preferably part of the carriage are submerged in the water.

16 Claims, 10 Drawing Figures

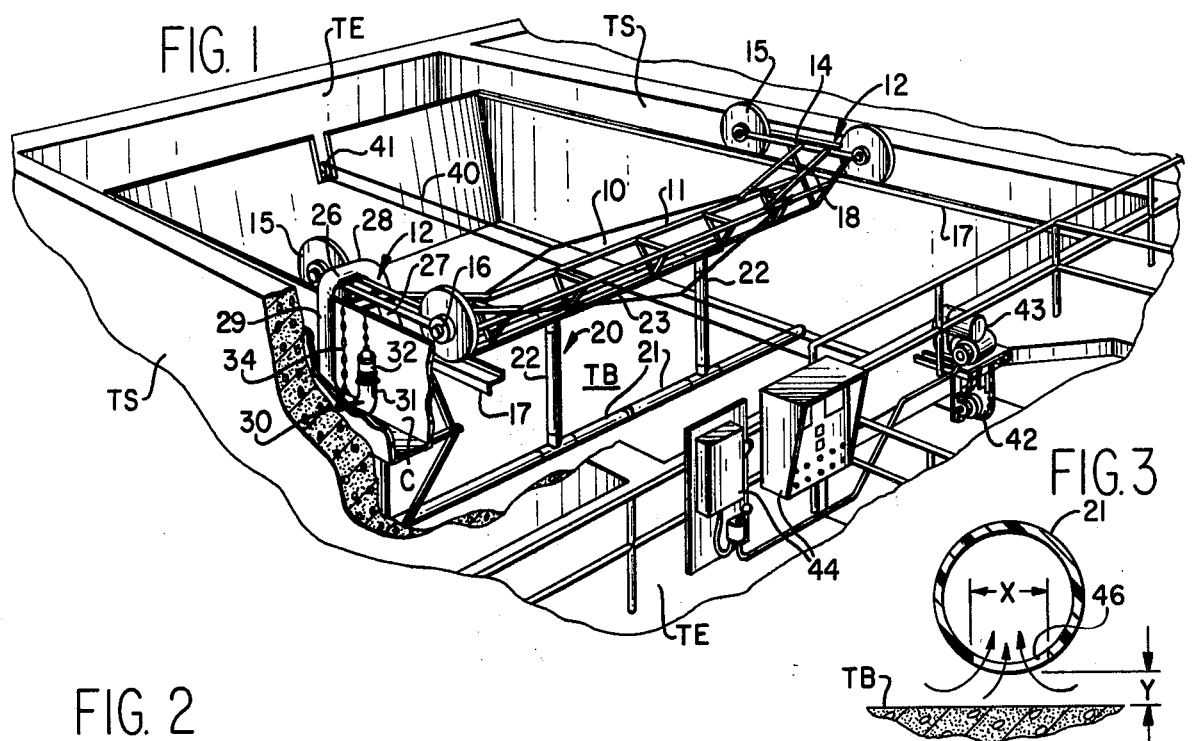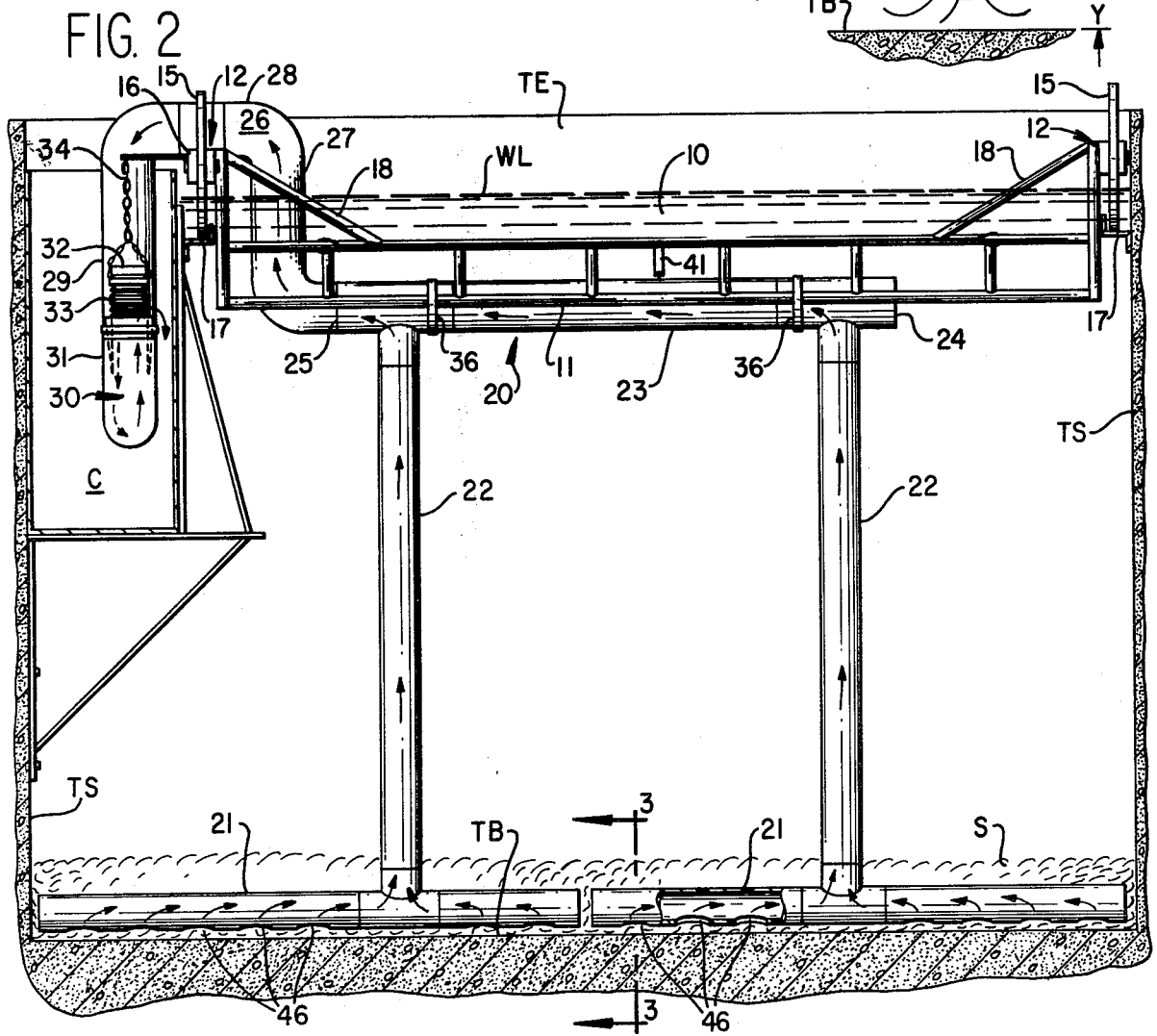

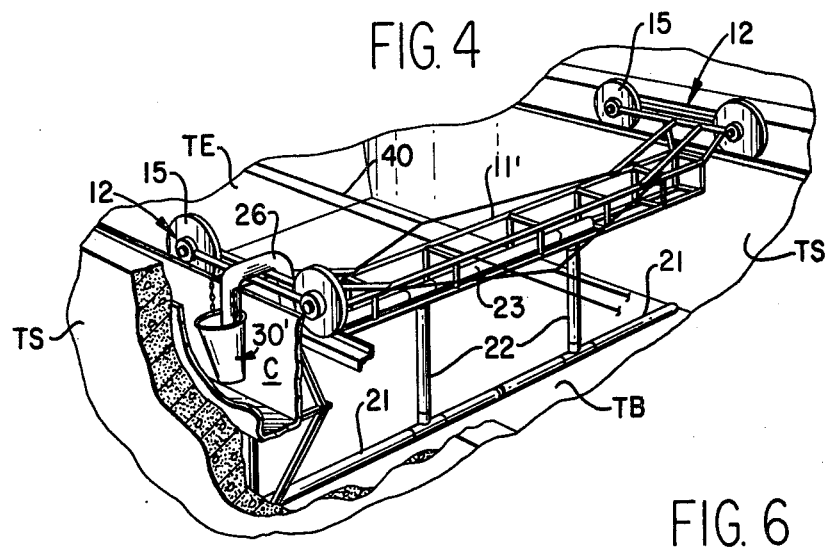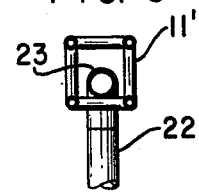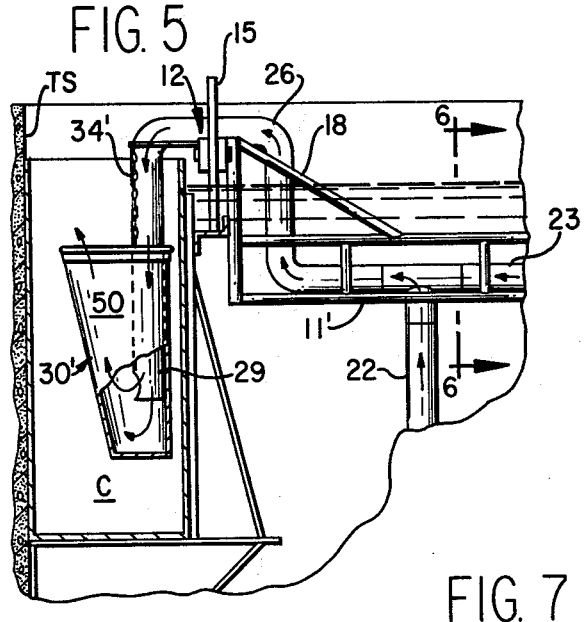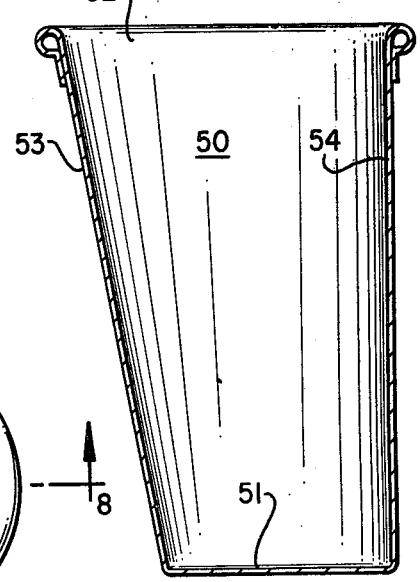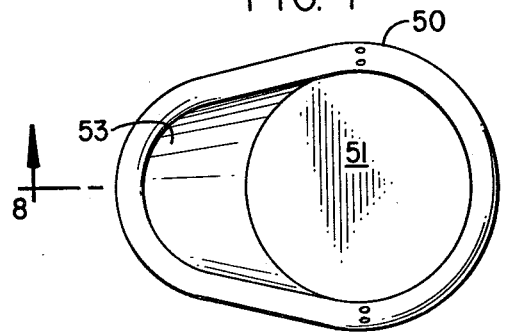

TRAVELING SIPHON SLUDGE COLLECTOR

The invention relates to improved apparatus for removing sludge or grit from the bottom of a settling tank, for example such as at a sewage treatment facility, and more particularly to an improved traveling siphon type sludge collector.

A typical settling tank will have either vertical or sloping side walls and a generally flat, but possibly sloping, bottom. Such tanks are frequently, but not necessarily, rectangular in shape. The influent, or water carrying suspended contaminants is frequently introduced at one end of the tank. As it flows slowly toward the opposite end the contaminants settle toward the bottom to form a sludge layer. The cleaned water, or effluent, flows from the influent end to the far end and out of the tank over a weir or through ports in the tank wall.

Many devices have been used to remove the settled sludge from the tank bottom, and they can generally be grouped into three types. Some of the earliest devices are simply chain driven scrapers which push the sludge along the tank bottom to a pit or channel at one end. It is then necessary to employ additional means to remove the sludge from the pit. In another system, the sludge is essentially vacuumed through a hose or pipe connected to a suction pump. This system has the disadvantage of requiring power to operate the pump as well as power to traverse the hose or pipe over the tank bottom.

Eventually, it was recognized that a siphon could be used to remove the sludge. A particular sludge removal system using a siphon is described in U.S. Pat. No. 3,333,704, in which each siphon conduit is supported by a float riding on the surface of the water. The siphon is traversed to and fro across the tank by a pulley-driven cable mounted above the water at the ends of the tank. The siphon extracts the sludge through an inlet near the tank bottom and discharges it over the wall of the tank. The present invention most particularly relates to this latter type of sludge removal system.

It is a principal object of the invention to provide an improved apparatus for removing sludge, grit, or like material from a settling tank in which a siphon tube is mounted such that it can be traversed over substantially the entire tank bottom with a minimum of effort.

It is a further object to provide a siphon-type sludge removal apparatus which is less susceptible to wind, freezing temperatures, and loss of siphon head due to leakage in the tube than are previous apparatus.

It is another object to provide a siphon-type sludge removal apparatus in which the sludge inlet remains a predetermined distance from either the tank bottom or sludge level despite changes in the water level or flow rate through the tank.

It is a further object to provide a siphon-type sludge removal apparatus in which the flow rate through the siphon can be controllably varied.

And finally it is an object of the invention to provide an apparatus accomplishing all of the above objectives and which can be economically manufactured and installed, and operated with a minimum of attention and maintenance.

All of these objectives are achieved by the present invention, the apparatus of which comprises a siphon tube, as hereinafter described, mounted for support in the settling tank on a traveling carriage. The siphon tube includes two or more sludge intakes disposed at spaced positions near the tank bottom and sludge layer such that together the intakes extend substantially across one dimension of the tank. The carriage is mounted for movement to and fro across a second dimension of the tank so that the intakes sweep across substantially the entire bottom. For instance, in a rectangular tank, the sludge intakes extend across the tank width while the carriage traverses along its length.

The siphon tube also includes a header which extends generally parallel to the arrangement of sludge intakes. Each intake is connected to the header by a generally vertical riser. All of the header, the risers, and the sludge intakes are submerged below the water level. The header is closed at one end. The other end of the header is connected to an arched section of the tube which extends up and over a side wall of the tank into a sludge discharge channel.

The carriage or bridge comprises a rigid member extending between opposed side walls of the tank. In one embodiment, the header section of the siphon tube serves also as the rigid member of the bridge. In other embodiments, the rigid member comprises a structural truss with the siphon header connected to and supported from the truss somewhere between its endpoints. Each end of the truss, or in the one embodiment the header, is connected to a light-weight wheel assembly which in turn is mounted for movement along a track. The tracks are fixed to the tank side walls either parallel to or in some other predetermined relationship to the tank bottom so that as the carriage moves therealong, the sludge intakes will sweep according to a predetermined spacing from the tank bottom. In the preferred embodiment, the tracks are mounted below the water level such that all of the truss and a substantial portion of the wheel assemblies are submerged.

The carriage and siphon tube are traversed across the tank by a pulley-driven cable which is also preferably mounted below the water level. The motor for driving the cable is mounted above the water level on one wall of the tank.

It is an important feature of the invention that nearly all of the siphon pipe and its carriage are submerged, and one which offers several advantages. Firstly, the buoyant effect of the water helps support the siphon tube and thereby allows the carriage to be of a light weight and economical construction. Secondly, since only the arched section of the siphon tube need be out of or above water level, small leaks in any other part of the pipe will not result in a loss of siphon vacuum and disruption of the operation. Furthermore, even if the siphon vacuum is lost, or upon startup of the apparatus, only a small volume of air has to be removed to prime the siphon. Thirdly, with most of the mass submerged, the wind has minimal effect on the apparatus. Therefore a smaller drive can be used and additional guide means other than the carriage wheels are not needed. And, finally, by having a substantial part of the carriage wheels and the cable drive submerged in the warm waste water, the risk of them being rendered inoperative by heavy snowfalls or ice on cold days is minimized.

It is another feature of the invention that the discharge end of the siphon tube is adjustable so that the flow through the apparatus can be varied to optimize the operating conditions. This is accomplished by making the discharge section movable with respect to the downwardly extending leg of the arched section to control the siphon head. In one embodiment, the discharge section is an inverted gooseneck section of tubing having one of its upstanding legs connected to downwardly extending leg of the arched section of the siphon tube and the other leg provided with a movable length of pipe joined by a flexible or accordian type sleeve. In another embodiment, the discharge section is a frustoconically shaped bucket disposed to move telescopically with respect to the downwardly extending leg of the arched section. Other embodiments of similar principle may be used for particular material concentrations.

Where desired, the discharge section can be made automatically adjustable. For example, the movable discharge can be connected to a follower which rides a cam positioned along the tank wall in relation to the carriage track such that the discharge section will be moved vertically in response to the traversing motion of the carriage and siphon pipe. The cam would be arranged to adjust the discharge in accordance to a predetermined profile corresponding to normal sludge levels.

Other features and advantages of the invention are set forth in the following more detailed description of several specific embodiments with reference to the accompanying drawings, which form a part of this specification, and of which:

FIG. 1 is an isometric view, partly broken away, showing a sludge collector embodying the invention;

FIG. 2 is a side elevation view of the sludge collector of FIG. 1;

FIG. 3 is a partial view in cross section through a sludge intake of the apparatus of FIG. 1 and as taken along the line 3—3 in FIG. 2;

FIG. 4 is a partial isometric view, partly broken away, of a modified embodiment of the invention;

FIG. 5 is a partial elevation view showing the discharge end of the apparatus of FIG. 4;

FIG. 6 is a partial view in cross section through the traversing carriage and siphon header as taken along the line 6—6 in FIG. 5;

FIG. 7 is a plan view looking down on the adjustable discharge section of the apparatus from FIGS. 4 and 5;

FIG. 8 is a side elevation in cross section of the discharge section as taken along the line 8—8 in FIG. 7;

Figure 9:
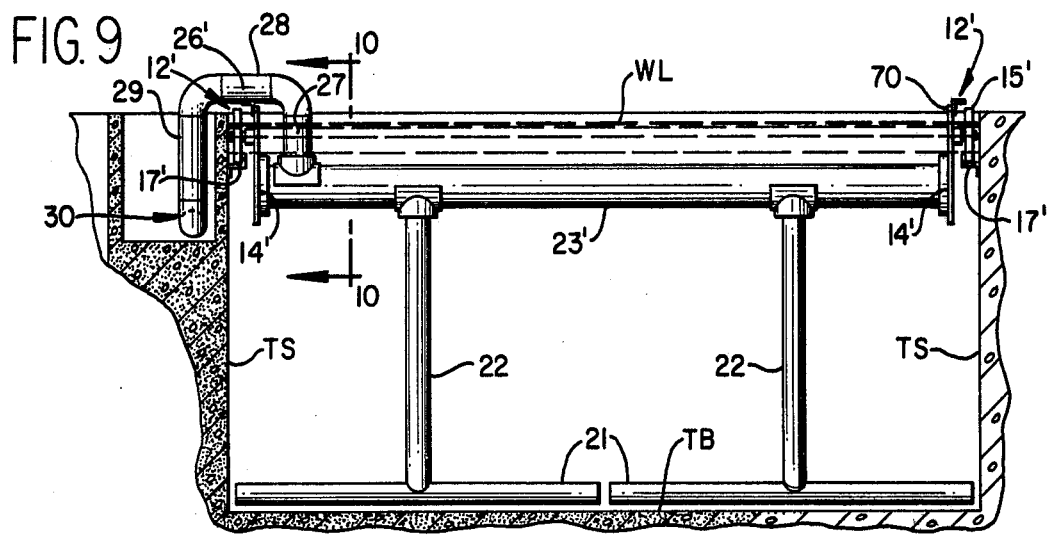
FIG. 9 is a side elevation view of another embodiment of the invention.

In the drawings, the invention is shown embodied in apparatus suited for use in a rectangular settling tank having side walls TS, end walls TE, a generally flat bottom TB, and a shallow sludge drainage channel C along one of its side walls. However, it will become apparent as the description continues that the invention can be embodied in modified apparatus suitable for use in tanks of other shapes, for instance, a circular tank.

In FIGS. 1 and 2, a carriage, or bridge as it is sometimes called in the industry, is indicated generally by the numeral 10. The carriage consists of a rigid member 11 extending across the width of the tank and connected at each end to a wheel assembly 12. In FIG. 1, the rigid member 11 is a structural truss having a generally triangular cross section and made of tubing of aluminum, or other corrosion resistant material. The frames 14 of the wheel assemblies 12 are similarly of lightweight structural material. Each wheel assembly has two wheels 15 of relatively large diameter. Although shown as solid circular discs, spoked wheels such as bicycle wheels or light plastic wheels have been found appropriate for this application. The wheels 15 in each frame 14 are preferably spaced well apart for improved guidance and alignment as well as support for the bridge 10.

The wheels 15 ride on and are guided in tracks 17 mounted along the side walls of the tank. In the preferred embodiment, the tracks are disposed below the normal water level WL such that a substantial portion of the wheels will also be submerged. Since the influent to the tank is usually warm (well above freezing even in cold latitudes on winter days), it doesn't freeze. Therefore, there is less chance of the wheel assemblies becoming retarded by snow in the tracks or icing over if they run partially below water level than if they run above. As shown in FIG. 2, the wheels 15 are only partially submerged, but with the appropriate bearings, they can be submerged beyond their axles.

The rigid member 11 is connected to the wheel assemblies 12 by support members 18 such that the member 11 is also below water.

The siphon tube, indicated generally at 20, is preferably, but not necessarily, circular in cross section throughout. The word tube as used here contemplates all conduits suitable for handling the flow of sludge and water, and is intended to include rigid tubing such as metal or plastic pipe and flexible tubing or hose.

The siphon tube includes sludge inlets or intakes 21 disposed near the tank bottom TB either in or above the sludge layer S as desired. As shown, the sludge inlets 21 are elongated and when aligned end-to-end extend nearly the full width of the tank bottom. A generally vertical riser 22 connects each intake to a common header 23 which also extends laterally across the tank.

One end 24 of the header 23 is closed, while the other end 25 is connected to the arched section 26. The arched section is in the form of an inverted U or gooseneck having an upwardly extending leg 27 connected to the header 23, an intermediate section 28 extending laterally across the interior wall of the sludge channel C, and a downwardly extending leg 29 disposed in the sludge discharge channel C.

An adjustable discharge section, indicated generally at 30, is connected to the bottom of the leg 29. In FIGS. 1 and 2, the discharge section is a gooseneck shaped section of pipe with its legs extending vertically upward. One of its legs is connected to the arched section 26, and the free end is vertically adjustable to control the siphon head. In this case, a short section of pipe or tubing 32 is telescopically connected to the vertical leg 31 by an accordian connection 33 of pleated material, such as a neoprene coated fabric, rubber hose, or the like. The pipe 32 is supported by a chain 34 from the carriage 10 in a manner such that the chain can be adjusted to raise or lower the pipe 32.

The entire siphon tube 20 is supported freely in the tank and sludge chamber from the carriage 10. As shown, the header 23 is fastened to the rigid truss 11 by straps 36. The siphon tube thus moves with the carriage 10 which is traversed to and fro the length of the tank by the cable 40. The cable is wrapped around the pulley 41 and driven by pulley 42 which is drivably connected to a gearmotor 43. The motor is mounted on one end wall above the water level WL as are the manual or automatic controls, indicated at 44, for the whole apparatus. However, the pulleys 41 and 42 are mounted such that they and cable 40 are below water, again to minimize the risk of their freezing up.

Referring now to FIGS. 2 and 3, the sludge intakes 21 each comprise a long section of pipe or tubing provided with a series of holes 46 along the bottom edge. The size and number of holes will vary with the application, for instance depending on whether the tank is a primary or secondary sewage treatment tank, or some other type of settling tank. It is also conceivable that a continuous slot may be preferable in a specific application although no particular advantage from it has been recognized to date.

The size of the holes 46 and their distance from the sludge layer or tank bottom will affect the velocity of the water and sludge drawn into the siphon tube. However, especially in primary tanks, large and assorted foreign objects will also be encountered. Thus larger holes have the advantage of handling rags and the like without plugging. Referring to FIG. 3, X indicates the diameter of the hole 46 and Y indicates the distance of the intakes 21 from the tank bottom. It is preferable to have X greater than Y because objects small enough to fit between the sludge intake and tank bottom should pass freely through the holes without plugging them. Larger objects will simply be pushed by the intake 21 to one end of the tank for removal by other means.

In the operation of the sludge collector of FIGS. 1-3, the carriage 10 and siphon tube 20 are traversed the length of the tank by the cable 40, such that the sludge intakes 21 sweep generally the entire tank bottom. A siphon having been established, sludge is drawn through the holes 46, flows through the riser 22, the header 23, the arched section 26 and the discharge 30 into the channel C. By raising or lowering the pipe section 32 of the discharge 30 the vertical distance between the discharge and the holes 46 is varied to control the sludge removal rate.

With the exception of part or all of the arched section 26, all of the siphon tube 20 and most of the carriage 10 are submerged. This feature offers several advantages. The buoyant effect of the water reduces the load and structural requirements of the carriage, tracks, and siphon tube. Therefore, a lighter and more economical structure can be used. Further, since a minimal part of the apparatus is out of the water, high opposing winds do not add to the drag resisting movement of the apparatus or tend to skew it at angles to the direction of travel. Therefore, a smaller drive can be used with less energy demand. Finally, since only a small volume of the siphon tube 20 is above water, only a small amount of air needs to be removed to start or re-prime the siphon. For the same reasons, any leaks which occur in the rest and largest part of the siphon pipe do not result in a loss of siphon vacuum and immediate disruption of the operation.

Figure 10:
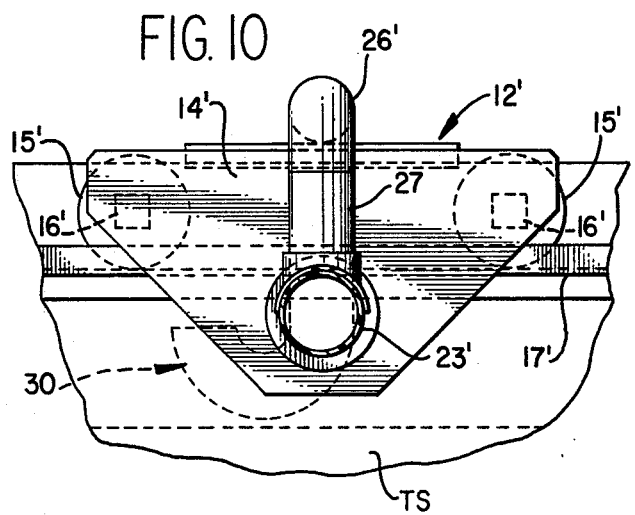
FIG. 10 is a partial view in cross section through the sludge collector of FIG. 9 as taken along the line 10—10 in FIG. 9.

Those skilled in the art will recognize numerous variations and modifications which could be made to the sludge collector of FIGS. 1 and 2 without departing from the scope of the invention. To illustrate, several modified embodiments are shown in FIGS. 4-10, wherein the same numerals are used to indicate parts identical to those in FIGS. 1 and 2 and prime numbers are used to indicate modified parts serving the same function.

First, referring to FIGS. 4-6, the sludge collector shown here has a carriage modified from those of FIGS. 1 and 2. The carriage is different in that the rigid member 11' is formed of small tubular members joined into a truss having a square cross section. In addition to simplicity in fabrication, the truss 11' can support the header 23 of the siphon pipe 20 internally without the need for straps or other fasteners.

In certain installations where only light sludge blankets are involved, such as in secondary or additional settling tanks, the functions of the rigid member of the carriage and the siphon header may be combined. For example, in the sludge collector of FIGS. 9 and 10, the header 23' of the siphon tube 20' is shown extending between and connected directly to the wheel assemblies 12'. This embodiment has the obvious advantage of eliminating the carriage truss of FIGS. 1-6 and should therefore be less expensive.

The modified wheel assemblies 12' comprise flat plates as frames 14' which space the bearings 16' and wheels 15'. The header 23' is connected at both ends to the plates 14' such that both ends of the header are sealed off. The arched section 26' of the siphon tube is connected to the header by a T-connector near one end of the header such that the siphon tube of FIGS. 9 and 10 operates the same as that of FIGS. 1-6.

Referring again to FIGS. 4-8 and another modification, the adjustable discharge 30' shown here comprises a frusto-conical bucket 50 supported by a chain 34' such that it telescopically surrounds the lower end of the leg 29 of the arched section 26. The bucket 50 has a closed bottom 51 and a larger open top 52. Although the bucket has an upwardly divergent conical wall 53 at least one portion of it 54 is perpendicular to the bottom 51.

The bucket 50 is supported such that the wall portion 54 is parallel with and close to the leg 29. Sludge bearing water flows down the leg 29, reverses and flows through the open end 52 of the bucket. Because of its divergent design, the bucket offers little resistance to flow. By adjusting the chain 34', the upper end of the bucket establishes the siphon head and sets the flow rate.

For simplicity, the sludge collectors of both FIGS. 1 and 4 have been shown with simple manual adjustments for the discharges 30 and 30', respectively, in the form of a simple chain 34 or 34' suspended from the carriage 10. In fact, such a simple manual adjustment may suffice in most applications. However, a variety of means for automatically adjusting the discharge to control the siphon head and flow rate are conceivable. For example, the discharge section 30 could be suspended from a separate carriage running on a track not parallel with the tracks 17. Such a device would automatically raise or lower the discharge as the collector traverses the tank to regulate the flow rate according to varying sludge depth, sludge density, or a varying tank bottom. More sophisticated means for supporting the discharge section, which would raise or lower it in response to a signal from a device sensing sludge level or density, or from a programmed controller, are envisionable.

Similarly, the traversing pattern and speed of the carriage and siphon pipe could be programmed by known means. As previously mentioned, the tracks 17 could be mounted at some angular relation to the tank bottom so that the distance of the sludge intakes will follow the profile of the normal sludge layer rather than the tank bottom. Finally, numerous variations in the construction of the siphon pipe or carriage based on structural considerations, as well as tank shape and size, will occur to fit the particular application.

The embodiments of the invention in which an exclusive property or privilege is claimed are defined as follows:

1. Apparatus for collecting and removing sludge from the bottom of a settling tank, comprising:

traveling support means mounted to at least one wall of the tank for movement parallel to said wall;

a siphon tube suspended in the tank from said traveling support means and comprising: a header disposed near the water's surface and extending laterally from said one tank wall substantially across one dimension of the tank, at least two sludge intakes disposed near the tank bottom proximate the settled sludge at spaced locations along said one dimension of the tank, each intake being connected to the header by a separate riser; and an arched section extending from one end of the header up and over a wall of the tank; and a flow regulating discharge section adjustably connected to the outlet end of the arched section and having an opening to discharge the sludge outside the tank, wherein all of said siphon tube except at least part of the arched section is submerged in the water in the tank; and drive means for moving the support means and siphon tube such that the sludge intakes sweep across the tank bottom while the siphon extracts the sludge and discharges it outside the tank.

2. A sludge collector as recited in claim 1, wherein the traveling support means comprises a carriage supported on a track along said one tank wall.

3. A sludge collector as recited in claim 2, wherein the carriage comprises a rigid member extending across said one dimension of the tank between a pair of parallel walls of the tank and is connected at each end to wheel assemblies movably supported on a track mounted to the respective wall.

4. A sludge collector as recited in claim 3, wherein said tracks are positioned such that a majority of the carriage is submerged in the tank.

5. A sludge collector as recited in claim 3, wherein the traveling support means comprises two wheel assemblies mounted on the tracks on opposite walls of the tank, and further wherein the header of the siphon tube extends between and is connected at each end to said wheel assemblies and serves as said rigid member.

6. A sludge collector as recited in claim 1, wherein each of said sludge intakes comprises an elongated section of pipe extending generally parallel to the tank bottom and having openings spaced along its bottom, and wherein the intakes are disposed generally end to end to extend substantially across said one dimension of the tank.

7. A sludge collector as recited in claim 6, wherein the openings along the bottom of the sludge intakes are round and the diameter of the holes is larger than the distance between the sludge intakes and the bottom of the tank.

8. A sludge collector as recited in claim 1, wherein the discharge section of the siphon tube is vertically adjustable with respect to the outlet end of the arched section, and further including means for vertically adjusting the effective level of the opening of the discharge section to regulate the flow or water and sludge through the siphon.

9. Apparatus for collecting and removing sludge from the bottom of a settling tank, comprising:

a siphon comprising: an integral tube having a plurality of sludge intakes disposed in and near the bottom of the tank proximate the settled sludge and each connected to a common header by a separate riser, said header being closed at one end and connected at its other end to an arched section which extends up and over the wall of the tank and has a free end outside the tank, all of said pipe except said arched section being supported below water in the tank; and a flow regulating discharge means adjustably mounted outside the tank wall in communication with the free end of the siphon tube such that raising or lowering the effective level of the discharge means respectively decreases or increases the flow of water and sludge through the siphon;

a traveling support mounted from the wall of the tank and in turn supporting the siphon tube in the tank; and drive means to move the traveling support and siphon tube about the tank whereby the sludge intakes sweep the tank bottom.

10. A sludge collector as recited in claim 9, wherein the traveling support comprises a pair of wheel assemblies mounted respectively on opposed walls of the tank on tracks disposed in predetermined relation to the tank bottom and connected by a rigid member extending across the tank.

11. A sludge collector as recited in claim 10, wherein substantially all of said rigid member is disposed below the water level in the tank.

12. A sludge collector as recited in claim 11, wherein the tracks and a substantial portion of the wheel assemblies are also submerged.

13. A sludge collector as recited in claim 9, wherein said drive means comprises a cable connected to the traveling support and passing around a drum mounted on the wall of the tank, and an electric motor connected to the drum, wherein said cable and drum are positioned below the water level in the tank.

14. A sludge collector as recited in claim 9, wherein the discharge means comprises a gooseneck section of tubing with one leg connected to the free end of the arched section of the siphon tube and having a telescopically extensible member at the end of its other leg.

15. A sludge collector as recited in claim 9, wherein the discharge means comprises a frusto-conical bucket having a closed bottom and a divergent open end disposed above and in telescopically surrounding relationship with the free end of the arched section of the siphon tube, and is supported from the traveling support.

16. A sludge collector as recited in claim 9 further including means for automatically adjusting the relative elevation of the discharge means in accordance with a predetermined relationship to either the sludge level, the tank bottom, or other control parameter.

* * * * *